United States Patent [19]

Higaki et al.

[11] Patent Number: 5,253,032
[45] Date of Patent: Oct. 12, 1993

[54] ACTIVE DISTANCE MEASURING APPARATUS

[75] Inventors: Riichi Higaki, Kawasaki; Yoshikazu Iida, Chigasaki, both of Japan

[73] Assignee: Nikon Corporation, Tokyo, Japan

[21] Appl. No.: 770,364

[22] Filed: Oct. 3, 1991

[30] Foreign Application Priority Data

Oct. 22, 1990 [JP] Japan .................. 2-282018

[51] Int. Cl.⁵ .............................. G01C 3/00
[52] U.S. Cl. ............................ 356/1; 356/4; 356/403
[58] Field of Search ................ 356/1, 403, 4

[56] References Cited

U.S. PATENT DOCUMENTS

| | | | |
|---|---|---|---|
| 4,758,082 | 7/1988 | Kozuki et al. | 356/1 |
| 4,909,624 | 3/1990 | Tsuru et al. | 356/1 |
| 5,008,695 | 4/1991 | Nagaoka et al. | 354/403 |

*Primary Examiner*—Mark Hellner
*Attorney, Agent, or Firm*—Shapiro and Shapiro

[57] ABSTRACT

An active distance measuring apparatus comprises a projector for projecting modulated light to an object, a photo-sensor for sensing the modulated light reflected by the object to produce a pair of alternating current signals in accordance with a distance to the object, and a signal processor for producing a distance signal in accordance with the pair of alternating current signals. The signal processor includes a detector means for detecting a voltage corresponding to each of the pair of alternating current signals a plurality of times and adding the results of such detection and repeating such detection and addition a plurality of times and a calculation for calculating the distance signal based on the output of the detector.

2 Claims, 4 Drawing Sheets

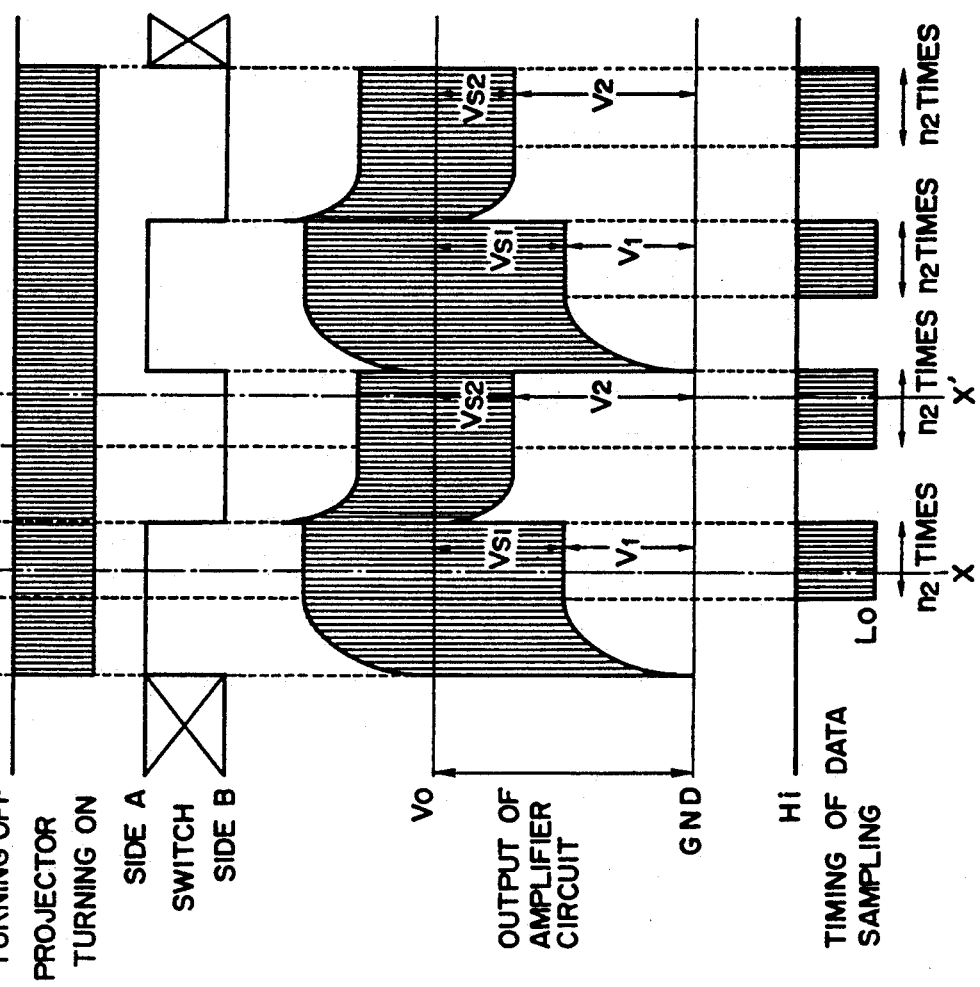

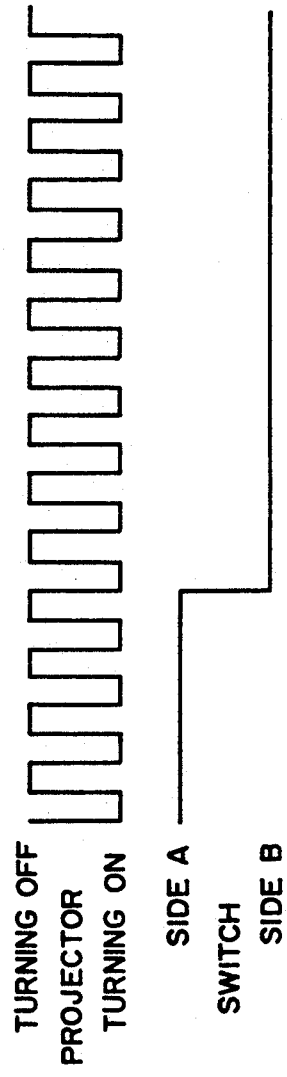
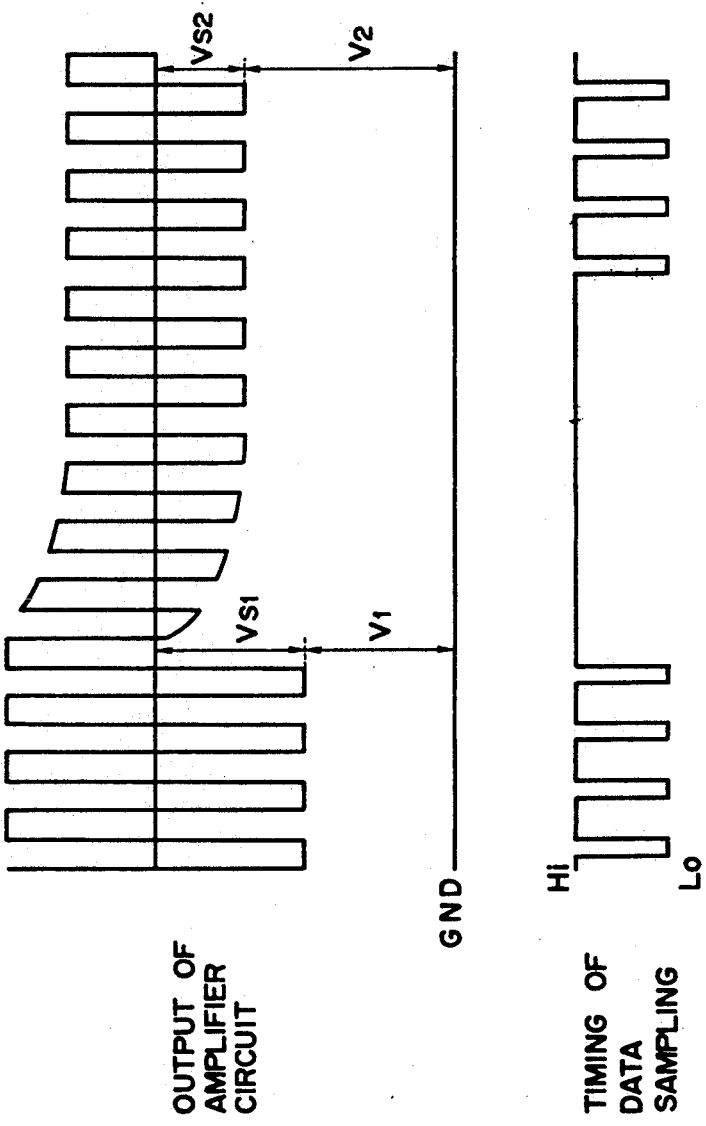
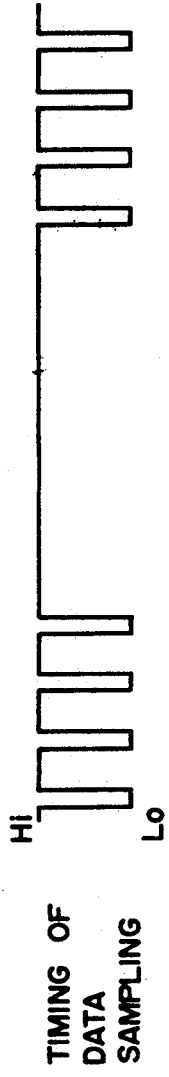
FIG. 4A TURNING OFF PROJECTOR TURNING ON
FIG. 4B SWITCH SIDE A / SIDE B
FIG. 4C OUTPUT OF AMPLIFIER CIRCUIT
FIG. 4D TIMING OF DATA SAMPLING

ACTIVE DISTANCE MEASURING APPARATUS

BACKGROUND OF THE INVENTION

1. Field the Invention

The present invention relates to an active distance measuring apparatus which projects modulated light to an object and measures a distance based on reflected light.

2. Related Background Art

As an active distance measurement apparatus of this type, an apparatus which pulse-modulates an infrared ray and projects it to an object has been known (for example, see U.S. Pat. No. 4,758,082 and U.S. Pat. No. 5,008,695). As a photo-sensor thereof, a photo-position sensing device (PSD) which takes out photo-currents $I_1$ and $I_2$ from a pair of output electrodes in accordance with an incident position of the reflected light has been known.

In such a distance measuring apparatus, the photo-currents $I_1$ and $I_2$ which are alternating current signals having a frequency equal to that of pulse-modulated light are periodically switched and they are converted to photo-signals $S_1$ and $S_2$ by current-voltage conversion amplifiers. The signals $S_1$ and $S_2$ are further amplified to appropriate voltages $V_{S1}$ and $V_{S2}$ by amplifiers. Then, the voltages $V_{S1}$ and $V_{S2}$ are sequentially A/D-converted and signal levels are read a plurality of times and they are added, and distance data L is calculated by a central processing unit (CPU) as follows.

$$L = a \cdot \frac{\Sigma V_{S1} - \Sigma V_{S2}}{\Sigma V_{S1} + \Sigma V_{S2}} \quad (1)$$

where $a$ is a constant.

In the above prior art, since the photo-currents $I_1$ and $I_2$ are sequentially processed, a ratio of the photo-currents $I_1$ and $I_2$ varies where a reflective index varies while a distance to an object such as a swinging curtain, does not change between the processings of $I_1$ and $I_2$. This creates an error in the distance data L.

SUMMARY OF THE INVENTION

It is an object of the present invention to provide an active distance measurement apparatus which eliminates influence of a change in a reflective index of an object and provides an accurate distance measurement signal.

In order to achieve the above object, the active distance measuring apparatus of the present invention comprises a projector for projecting modulated light to an object, a photo-sensor for sensing the modulated light reflected by the object to produce a pair of alternating current signals in accordance with a distance to the object and a signal processor for producing a distance signal in accordance with the pair of alternating current signals. The signal processor includes detection means for detecting a voltage corresponding to each of the pair of alternating current signals a plurality of times and adding the results of such detection and repeats such detection and addition a plurality of times, and operation means for producing the distance signal based on the output of the detection means.

BRIEF DESCRIPTION OF THE DRAWINGS

FIGS. 3A to 3D show time charts for explaining read-in of data, and

FIGS. 4A to 4D show details of portions X-X' of FIGS. 3A to 3D.

DETAILED DESCRIPTION OF THE PREFERRED EMBODIMENTS

Figure 1:
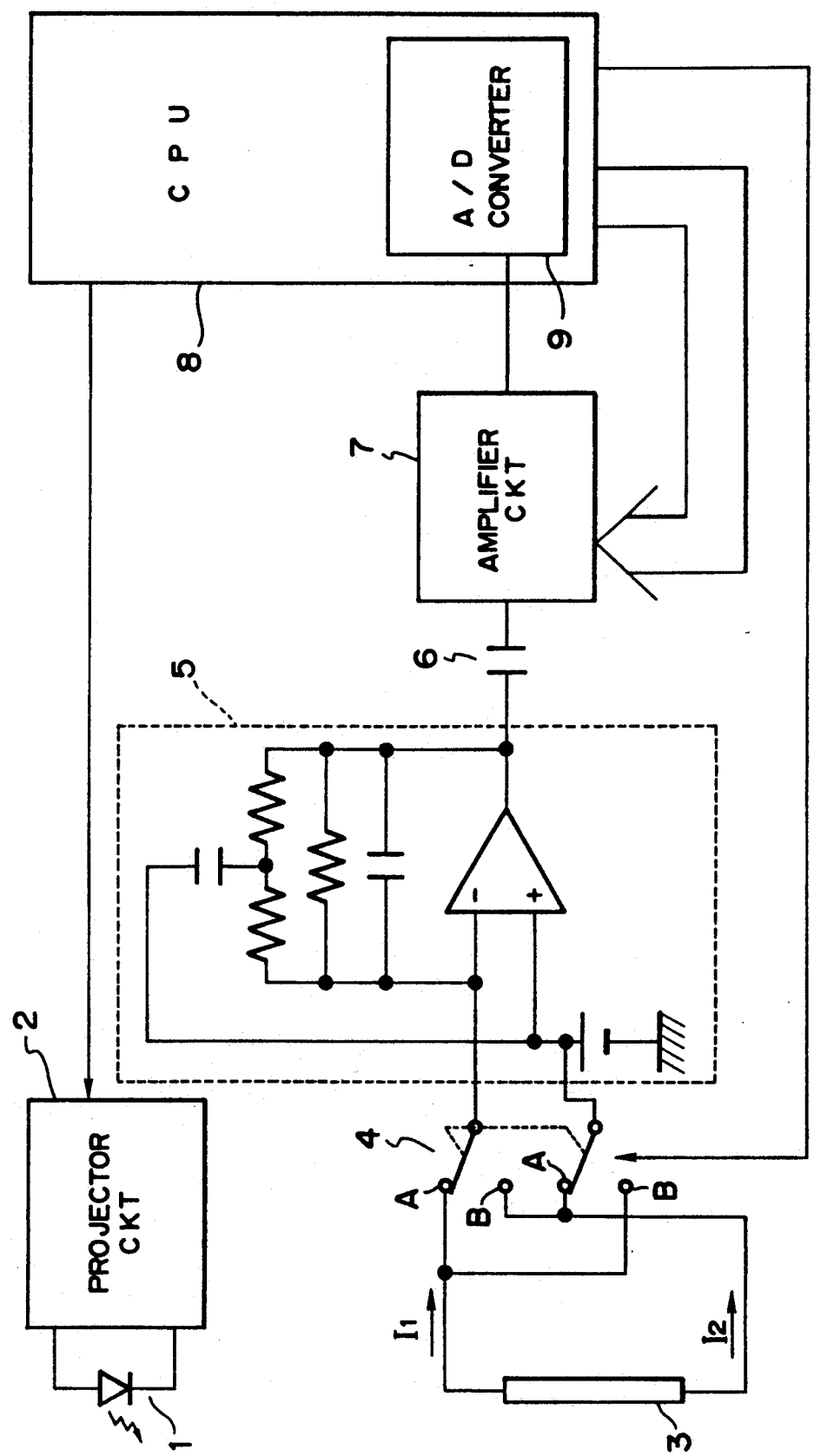
FIG. 1 shows a configuration of a distance measuring apparatus.

An embodiment of the present invention is explained with reference to FIGS. 1 to 4A through 4D.

An infrared ray projector 1 which projects an infrared ray has the flashing thereof controlled by a projection circuit 2 as shown in FIGS. 3A and 4A, and projects modulated light to an object. A photo-position sensing device (PSD) 3 senses the modulated projected light reflected by the object and produces photo-currents $I_1$ and $I_2$ in accordance with the photo-sensing position. The photo-currents $I_1$ and $I_2$ are alternating current signals having a frequency equal to that of the modulated light. A switch 4 is switched by a command from a CPU 8 as shown in FIGS. 3B and 4B to select one of the pair of photo-currents $I_1$ and $I_2$.

A head amplifier 5 is a current-voltage converter having a characteristic of a band-pass filter which passes the frequency of the modulated light and it converts the photo-currents $I_1$ and $I_2$ to photo-sense signals $S_1$ and $S_2$ without influence by steady state light. The photo-sensing signals $S_1$ and $S_2$ are supplied to an amplifier 7 through a coupling capacitor 6. The amplifier 7 amplifies the voltage-converted photo-sensing signals $S_1$ and $S_2$ to voltage signals $V_{S1}$ and $V_{S2}$ and a gain thereof is variably controlled by the CPU 8 so that a maximum amplification is attained without saturating the voltage signals $V_{S1}$ and $V_{S2}$. The voltage signals $V_{S1}$ and $V_{S2}$ amplified by the amplifier 7 are converted by an A/D converter 9 to digital signals based on voltages $V_1$ and $V_2$ measured from a ground level (GND) as shown in FIGS. 3C and 4C. The CPU 8 controls the respective units in accordance with a process to be described later to produce the distance data.

The process for calculating the distance signal is now explained with reference to the flow chart shown in FIG. 2.

In a step 100, the respective units are initialized. In a step 110, a voltage signal $V_0$ produced when the gain of the amplifier 7 which is a reference to the calculation is minimum is read. In a step 120, the flashing of the projector 1 is initiated (at $t_1$ in FIG. 3A). In a step 130, the gain of the amplifier 7 is set, and the voltages $V_1$ and $V_2$ are read in steps 140–200.

In a step 150, the switch 4 is positioned to A (photo-current $I_1$) (at $t_2$ in FIG. 3B). After the output of the amplifier 7 has been stabilized, the voltage $V_1$ is sampled $n_2$ times at a timing which causes the timing of data sampling in FIGS. 3D and 4D to $L_0$ in a step 160 (at $t_2$ in FIG. 3B) and the samples are added. In a step 170, the switch 4 is positioned to B (photo-current $I_2$) (at $t_3$ in FIG. 3B). In a step 180, the voltage $V_2$ is sampled $n_2$ times (from $t_4$ in FIG. 3B) like in the step 160, and the samples are added.

The above steps 150–180 are repeated $n_1$ times. In a step 210, the flashing of the projection 1 is stopped. In a step 220, the CPU 8 calculates the distance data in accordance with the formula;

$$L = \gamma \times \left[\left\{\left(n_1 \cdot n_2 \cdot V_0 - \sum_{n1}\sum_{n2} V_1\right)\right\} - \right. \tag{2}$$
$$\left\{\left(n_1 \cdot n_2 \cdot V_0 - \sum_{n1}\sum_{n2} V_2\right)\right\}\right] \div$$
$$\left[\left\{\left(n_1 \cdot n_2 \cdot V_0 - \sum_{n1}\sum_{n2} V_1\right)\right\} + \right.$$
$$\left.\left\{\left(n_1 \cdot n_2 \cdot V_0 - \sum_{n1}\sum_{n2} V_2\right)\right\}\right]$$

when $\gamma$ is a constant.

Finally, in a step 230, the distance data L is outputted.

Figure 2:
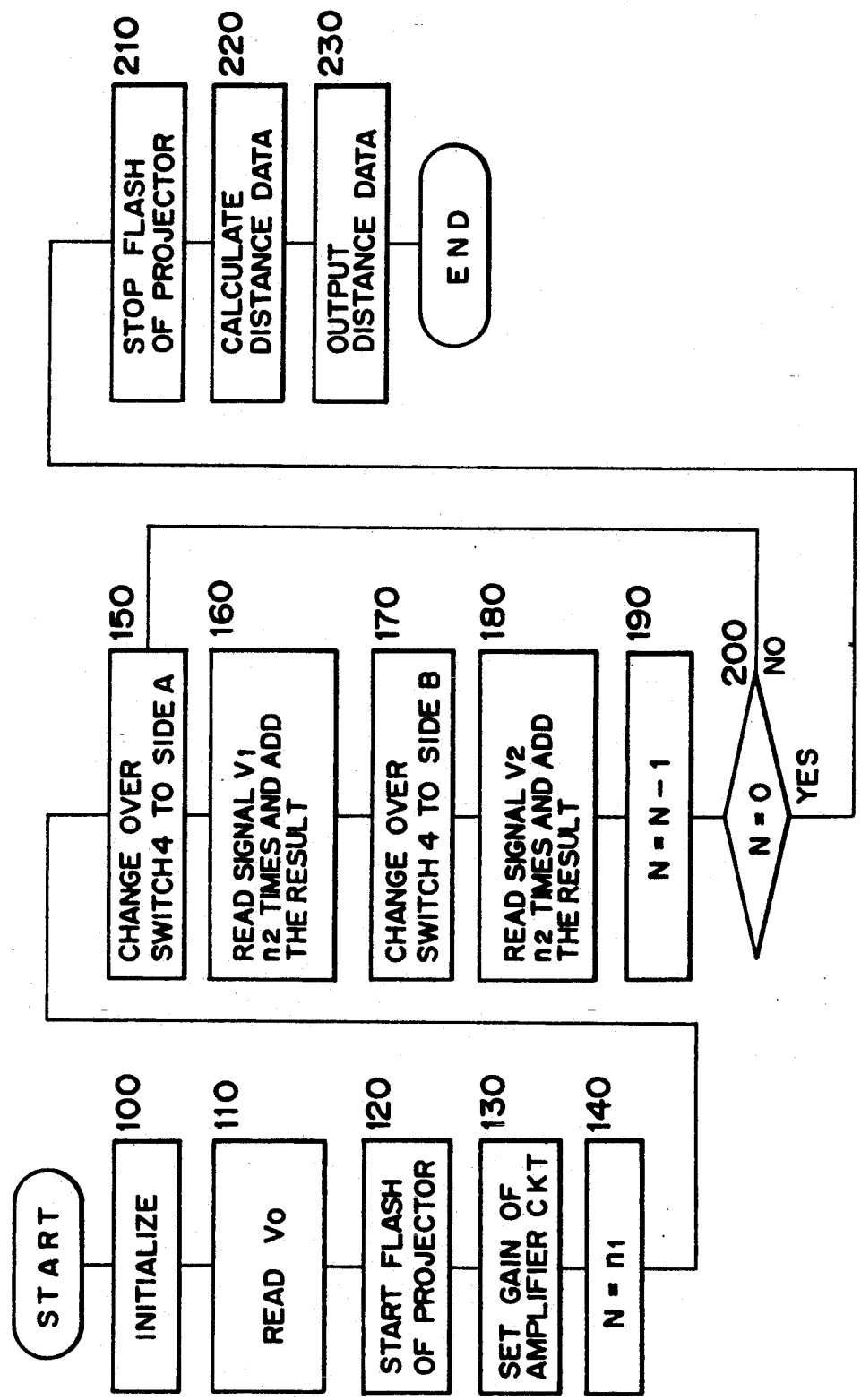
FIG. 2 shows a flow chart of a process for calculating distance data.

In the above embodiment, in the return from the step 200 to the step 150, the process of reading and adding each of the voltage signals $V_{S1}$ and $V_{S2}$ a plurality of times is repeated as shown in the flow chart of FIG. 2. In the prior art the distance measurement may include an error if the reflective index of the object changes between the readings of $V_{S1}$ and $V_{S2}$. By repeatedly reading and adding the voltage signals $V_{S1}$ and $V_{S2}$ a plurality of times, the voltage signals $V_{S1}$ and $V_{S2}$ are averaged and the accuracy in the measurement is improved. Accordingly, the accuracy in the distance measurement is improved for the object whose reflective index changes between successive readings.

We claim:

1. An active distance measuring apparatus comprising:
   a projector for projecting modulated light to an object;
   a photo-sensor for sensing the modulated light reflected by the object to produce a pair of alternating current signals in accordance with a distance to the object; and
   a signal processor for producing a distance signal in accordance with the pair of alternating current signals;
   said signal processor including detection means for detecting, first, a voltage corresponding to one of the pair of alternating current signals a plurality of times and adding the results of the first detecting, and then for detecting, second, a voltage corresponding to the other of the pair of alternating current signals a plurality of times and adding the results of the second detecting, and for repeating the first detecting and adding alternately with the second detecting and adding a plurality of times, and calculation means for calculating the distance signal based on the repeated detecting and adding by said detection means.

2. An active distance measuring apparatus comprising:
   a projector for projecting modulated light to an object;
   a photo-sensor for sensing the modulated light reflected by the object to produce a pair of alternating current signals in accordance with a distance to the object;
   a signal processor for producing a distance signal in accordance with said pair of alternating current signals; and
   switching means for supplying said pair of alternating current signals to said signal processor alternately and repeatedly;
   said signal processor including means for sampling, first, a voltage corresponding to one of said alternating current signals a plurality of times in response to the supplying of said one alternating current signal to said signal processor, and adding the results of said first sampling, for sampling, second, another voltage corresponding to the other of said alternating current signals a plurality of times in response to the supplying of said other signal to said signal processor, and adding the results of the second sampling, and for repeating the first sampling and adding alternately with the second sampling and adding a plurality of times, and calculation means for calculating the distance signal based on the repeated sampling and adding.

* * * * *